(12) United States Patent
Warnick et al.

(10) Patent No.: US 12,259,962 B1
(45) Date of Patent: Mar. 25, 2025

(54) NON-FUNGIBLE TOKEN TRANSACTION MANAGEMENT SYSTEMS AND METHODS FOR USER VERIFICATION OR CREDENTIALING

(71) Applicant: United Services Automobile Association (USAA), San Antonio, TX (US)

(72) Inventors: Mark Paxman Warnick, San Antonio, TX (US); Bharat Prasad, San Antonio, TX (US); Carlos J P Chavez, San Antonio, TX (US); Ravi Durairaj, San Antonio, TX (US); Mitzi Ruiz, San Antonio, TX (US); Theresa Marie Matowitz, San Antonio, TX (US); Huihui Wu, Grapevine, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 143 days.

(21) Appl. No.: 17/682,524

(22) Filed: Feb. 28, 2022

(51) Int. Cl.
*G06F 21/45* (2013.01)

(52) U.S. Cl.
CPC .................... *G06F 21/45* (2013.01)

(58) Field of Classification Search
CPC ............ H04L 9/3247; G06Q 20/38215; G06Q 20/389; G06F 21/45
See application file for complete search history.

(56) References Cited

U.S. PATENT DOCUMENTS

| | | | |
|---|---|---|---|
| 2008/0077632 A1* | 3/2008 | Tysowski | G06F 16/2358 |
| 2016/0203527 A1* | 7/2016 | Grasso | G06Q 30/0282 |
| | | | 705/51 |
| 2018/0218020 A1* | 8/2018 | Dutta | G06F 16/22 |
| 2023/0118406 A1* | 4/2023 | Antonio | E21B 47/12 |
| | | | 705/27.1 |

OTHER PUBLICATIONS

NFTCert: NFT-Based Certificates With Online Payment Gateway (Year: 2021).*

* cited by examiner

*Primary Examiner* — Bryan Y Lee
(74) *Attorney, Agent, or Firm* — Fletcher Yoder P.C.

(57) ABSTRACT

A non-fungible management system may generate non-fungible tokens based on credential data of a user. In one example, a non-fungible token can be generated responsive to receiving credential data for the user, whereby the credential data is received from a verified credentialing organization. Non-fungible tokens based on credential data can be held in a digital wallet of the user, used as a resume or record of achievement, and/or traded in a marketplace.

19 Claims, 5 Drawing Sheets

NON-FUNGIBLE TOKEN TRANSACTION MANAGEMENT SYSTEMS AND METHODS FOR USER VERIFICATION OR CREDENTIALING

BACKGROUND

The present disclosure relates generally to systems and methods related to non-fungible tokens used for secure transactions. More specifically, the techniques discussed herein relate to management of non-fungible tokens that may serve as user verifications or credentials.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A non-fungible token (NFT) is a unit of data that may be stored in a distributed ledger and that is unique and/or noninterchangeable such that unique identity and ownership can be confirmed. NFTs can encompass digital artworks (e.g., images and/or audio data), digital collectibles, assets or inventory of video games, digital information, or programs or instructions to generate physical products by way of example. As the NFT marketplace grows, owners would benefit from management platforms for NFTs.

SUMMARY

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In one embodiment, a non-fungible token management system may include a memory storing executable instructions and a processor. The processor may be configured to execute instructions to receive credential data associated with a user from a credentialing organization; and generate a non-fungible token responsive to receiving the credential data associated with the user, wherein the non-fungible token comprises a record in a distributed ledger and associated content based on the credential data associated with the user, wherein the associated content is stored outside of the distributed ledger and wherein a storage location of the associated content of the non-fungible token is determined based on the record.

In another embodiment, a non-fungible token management system may include a memory storing executable instructions and a processor. The processor may be configured to execute instructions to manage digital wallets for a population of users; receive credential data associated with an individual user of the population of users; generate a non-fungible token based on the credential data; and store the non-fungible token in a digital wallet of the user.

In yet another embodiment, a non-fungible token management method may include the steps of receiving first credential data for a first user; determining that the first credential data is from a verified credentialing organization; populating a set of data fields of a plurality of data fields using the first credential data; using the populated data fields to generate a first non-fungible token; receiving second credential data for a second user; determining that the second credential data is from the verified credentialing organization; populating the set of data fields of the plurality of data fields using the second credential data; and using the populated data fields to generate a second non-fungible token.

BRIEF DESCRIPTION OF THE DRAWINGS

Various aspects of this disclosure may be better understood upon reading the following detailed description and upon reference to the drawings in which.

DETAILED DESCRIPTION

Figure 1:
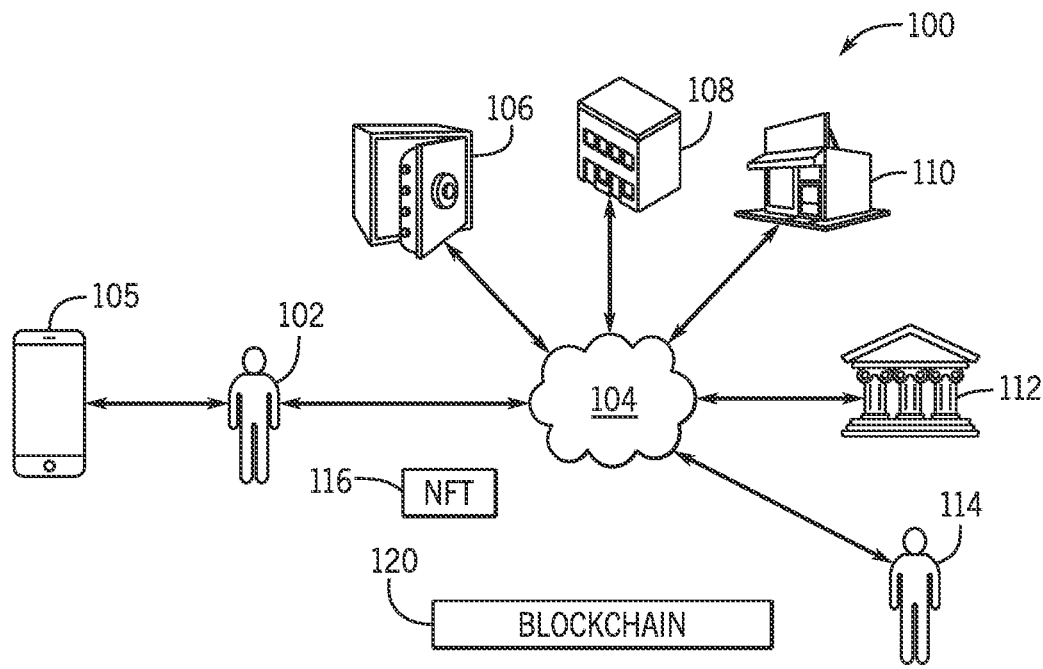
FIG. 1 is a schematic illustration of an environment in which a non-fungible token management system may operate, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code. When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments are generally directed toward non-fungible token (NFT) management techniques that facilitate creation, valuation, authentication, insurance, exchange, and/or storage of NFTs in secure transactions. In some embodiments, the NFT management system may allow users to create and/or maintain a secure NFT. The NFT management system may include a portal to allow access to a marketplace, authentication data, insurance information, and insurance purchasing. In an embodiment, the portal of the NFT management system may include a marketplace for the user to sell their NFTs. As such, the user may access the portal to place their NFT on the marketplace for sale and accept an offer from the highest bidder for their NFT. The disclosed management systems can create confidence in secondary marketplaces for NFTs and also a marketplace for insuring authenticity or insuring against possible loss. Insuring against possible loss may involve analysis of storage scenarios and storage system integrity (e.g., security from hacking, loss of power, natural disaster) for NFT-associated files.

In certain embodiments, the NFT management system can provide NFTs that serve as credentials or records of accomplishment for a particular user. In one example, the credential can be a verified user status on the management system (e.g., similar to a blue check mark indicated a verified identity on social media platforms). In another example, the NFT can be issued upon receiving a particular rank or award (e.g., military promotion, athletic performance). The credential-conferring NFT can be held by a particular user in their digital wallet. The user can, in embodiments, sell or trade an NFT. For example, an NFT of an athletic performance award can be traded as an online card.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. The NFT management system may execute, using a processor, instructions stored in a memory, for insurance evaluation. The executed instructions may be implemented as part of an analysis engine.

The present disclosure details various embodiments for NFT management. FIG. 1 illustrates an example environment 100 in which a non-fungible token (NFT) management system 104 may operate, in accordance with embodiments described herein. A user 102 can interact with and access the NFT management system 104 via a user device 105. The NFT management system 104 may provide NFT management services to a large number of different organizations or individuals, and may act as a clearinghouse for various types of NFT transactions. For example, the NFT management system 104 may permit one or more NFT transactions of the user 102, a cloud storage system 106, companies and institutions 108, merchants and retailers 110, financial institutions 112, and other users 114. In some embodiments, the companies and institutions 108 may include health insurance companies, life insurance companies, credentialing organization, or the like. The NFT management system 104 facilitates interactions with one or more NFTs 116, which may be stored in the NFT management system 104, transferred via the system 104, accessed via the NFT management system 104, valued by the NFT management system 104, insured via the NFT management system 104, and/or authenticated by the NFT management system 104.

In some embodiments, the NFT management system 104 may facilitate user authentication, which is a technology area that deals with identifying individuals in a system (such as a country, a network, or an enterprise) and controlling access to resources, such as managed NFTs 116, within that system by associating user rights and restrictions with user-associated NFTs and permitting user transactions with NFTs that are owned by the user or that are permitted by an owner of an NFT 116, which may be facilitated in the system 104. In general, the NFT management system 104 may maintain user information for the user 102, companies and institutions 108, merchants and retailers 110, financial institutions 112, other users 114, and the like. In addition, the NFT management system 104 facilitates and maintains NFT identification information and NFT digital data, which can be under user control.

Some of the features that may be provided by the NFT management system 104 includes access to NFT transactions from a mobile application, an embedded application operating on the user device 105, or a web application. In certain embodiments, the NFT management system 104 may securely store identity attributes of the NFT 116 on a blockchain.

As provided herein, the NFT 116 is a token used to represent ownership of one or more unique items. Accordingly, the NFT 116 may refer to a blockchain address or hash associated with the NFT 116 that includes a fixed number of alphanumeric characters generated from a public and private key pair. The NFT 116 may also include digital raw or compressed data representative of the NFT 116 and that is associated with a unique blockchain address. As provided herein, the NFT management system 104 may store the identifier hash, while the digital data of the NFT 116 is stored elsewhere, e.g., the digital data of the NFT 116 (e.g., the image data, the audio data) is stored off-chain. Specifically, the digital data may be digital credential data (e.g., data showing academic diplomas, academic degrees, certifications, security clearances, licenses, awards, years of service, military rank) of the user. In embodiments, the NFT management system 104 also stores the digital data of the NFT 116. The NFT 116 may also include metadata (e.g., a JSON file) associated with the digital NFT data. Ownership of the NFT 116 may include ownership of hex values encoding transaction elements, such as function names, parameters, and return values, and that are used to access the data of the NFT 116.

The NFT 116 may, in embodiments, be a type of cryptocurrency that uses smart contracts. However, in contrast to digital coins, which are fungible, each NFT 116 is digitally unique such that no two NFTs 116 are the same. For example, even for items that are multiples of one another (e.g., multiple digital copies of an artwork), each NFT 116 would still have a unique identifier (e.g., a bar code), with only one owner. The intended scarcity of the NFT 116 is set by the creator. A creator may intend to make each NFT 116 completely unique to create scarcity or produce several thousand replicas (each replica having its own unique, non-fungible identifier, similar to an artist print marked as 1/10). Every NFT 116 has an owner of public record that can be verified. In embodiments, NFT creators can retain ownership rights over their own work, and claim resale royalties directly. Thus, the owner of the NFT 116 may have financial arrangements or royalty arrangements that are dictated within the smart contracts of the NFT record.

Creation or minting of an NFT 116 involves confirmation of the NFT 116 as an asset on the blockchain, and the owner's account balance is updated to include that asset. This makes it possible for the NFT 116 to then be traded or verifiably owned. The transactions that confirm the above are added to a block on the chain. The block may be confirmed by everyone in the network as correct. This consensus removes the need for intermediaries because the network verifies the NFT 116 and ownership. As provided herein, the NFT 116 may be created on the Ethereum blockchain. In an embodiment, the NFT 116 may be part of the ERC-721, ERC-1155, and/or EIP-2309 standard.

The NFT management system 104 may employ a blockchain infrastructure to perform NFT management utilized in connection with digital transactions such as NFT minting (e.g., NFT creation), authentication, storage, or financial transactions (e.g., NFT purchasing or exchange, valuation, insurance). In general, blockchains are continuously growing lists of records (e.g., blocks), which are linked and secured using cryptography, for example. By using a blockchain infrastructure that enables the functionality of smart contracts, the methods and systems described herein allow a persistent, replicated, public, and automated database for transactions that involve NFTs.

As such, the embodiments described herein include methods and systems for deployment, maintenance, and interaction with the distributed ledgers and smart contracts to facilitate NFT management for the purpose of performing digital transactions (e.g., financial transactions, exchanges of information). The embodiments described herein may include blockchain techniques, as well as the terminals and servers that operate blockchain nodes, as described herein. Technical advantages of the embodiments described herein also include the use of public and/or private blockchains to perform automated, trusted operations for the purpose of conducting digital transactions involving NFTs 116. The systems described herein allow the performed operations to be transparent and tamper-proof and, thus, may increase the accuracy of, and security with, conducting digital transactions. Moreover, the techniques described herein may also reduce network congestion by, for example, reducing the amount of data transferred between entities that communicate using a network or between two different portions of one entity communicating using a network.

Referring again to FIG. 1, in certain embodiments, the blockchain 120 may be a public or private ledger of all transactions that have been executed in one or more contexts (e.g., negotiable instrument transactions, digital currency transactions, access determinations, instances of providing access, reviews, etc.). The blockchain 120 may grow as completed blocks are added with a new set of transactions by the NFT management system 104. In certain embodiments, a single block is provided from multiple transactions (e.g., multiple statements of authenticity for the NFT 116). In general, blocks are added to the blockchain 120 in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions. Each node maintains a copy of the blockchain 120, which is automatically downloaded to the node upon joining the peer-to-peer network. The blockchain protocol provides a secure and reliable method of updating the blockchain 120, copies of which are distributed across the peer-to-peer network, without use of a central authority.

Because all entities on the blockchain network may need to know all previous transactions to validate a requested transaction, all entities must agree on which transactions have actually occurred, and in which order. For example, if two entities observe different transaction histories, they will be unable to come to the same conclusion regarding the validity of a particular transaction. The blockchain 120 enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain 120). In certain embodiments, the blockchain 120 may also employ other protocols. In this context, the work is a task that is difficult for any single node (e.g., computing device) in the peer-to-peer network to quickly complete, but is relatively easy for a node (e.g., computing device) to verify.

The peer-to-peer network includes miners (e.g., computing devices) that add blocks to the blockchain 120 based on the blockchain protocol. In general, multiple miners validate transactions that are to be added to a block, and compete (e.g., perform work, as introduced above) to have their block added to the blockchain 120. Validation of transactions includes verifying digital signatures associated with respective transactions. For a block to be added to the blockchain 120, a miner must demonstrate a proof of work before their proposed block of transactions is accepted by the peer-to-peer network, and is added to the blockchain 120. In certain embodiments, the blockchain protocol includes a proof of work scheme that is based on a cryptographic hash function (CHF). In general, the CHF receives information as input, and provides a hash value as output, the hash value being of a predetermined length. In certain embodiments, the hash value is a one-way hash value, in that the hash value cannot be "un-hashed" to determine what the input was. In certain embodiments, the blockchain protocol may require multiple pieces of information as input to the CHF. For example, the input to the CHF may include a reference to the previous (most recent) block in the blockchain 120, details of the transaction(s) that are to be included in the to-be-created block, and a nonce value (e.g., a random number used only once).

Multiple nodes may compete to hash a set of transactions and provide the next block that is to be added to the blockchain 120. In certain embodiments, the blockchain protocol provides a threshold hash to qualify a block to be added to the blockchain 120. For example, the threshold hash may include a predefined number of zeros (Os) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain 120. Each miner provides the reference to the previous (most recent) block in the blockchain 120, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain 120. Consequently, the respective miner's block is broadcast across the peer-to-peer network. All other miners cease work (because one miner was already successful), and all copies of the blockchain 120 are updated across the peer-to-peer network to append the block to the blockchain 120. Each miner may be required to produce hundreds or thousands of hash values, before any one miner provides a qualifying hash value (e.g., at least the first four characters of the hash value are each zero).

In certain embodiments, the distributed ledger (or blockchain 120) system may include one or more sidechains. A sidechain may be described as a blockchain 120 that validates data from other blockchains 120. In certain embodiments, a sidechain enables ledger assets (e.g., a digital currency) to be transferred between multiple blockchains 120. In certain embodiments, the blockchain 120 may be a public blockchain, such that data stored on the blockchain 120 is generally accessible. In other embodiments, the blockchain 120 may be a private blockchain, such that the stored data is accessible only to authorized individuals and/or processes on the blockchain 120. In certain embodiments, the blockchain 120 may also be a hybrid of public and private blockchains. For example, the NFT management system 104 may utilize a privately managed, but publicly readable blockchain 120. In this manner, some identity information about a user 102 may be stored in a sidechain. In certain embodiments, the NFT management system 104 may store multiple different NFTs 116 associated with respective different users 102.

Figure 2:
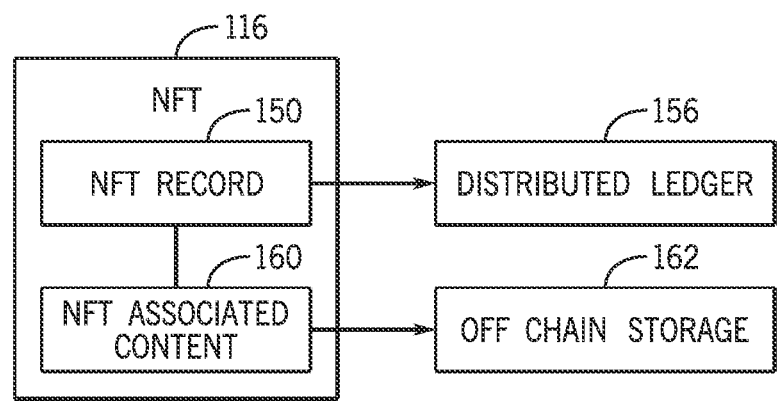
FIG. 2 is a block diagram of non-fungible token storage arrangement, in accordance with an embodiment.

FIG. 2 shows an example NFT 116 and storage arrangement that includes an NFT record 150 (e.g., a token, such as a hash) that is stored and validated in a distributed ledger 156 (e.g., a blockchain record). The NFT record 150 includes ownership information and transaction histories. The NFT record 150, as discussed herein, includes a unique identification that uniquely identifies NFT associated content 160, which can be one or more files that includes the digital data of the NFT 116, such as text, image files, video files, audio files, game item files, or any suitable NFT associated content 160. For example, the NFT associated content 160 may include digital credential data, which may include an educational credential (e.g., Bachelor of Science), certification credential, military rank, years of service, membership in an organization, awards, participation in conferences, published articles, or the like. The NFT associated content 160 may include metadata. While the NFT record 150 is stored in the distributed ledger 156, e.g., a blockchain, storing the NFT associated content 160 in a distributed ledger format may be prohibitively expensive, particularly for larger files. Accordingly, NFT associated content 160 can be stored in an off-chain storage 162. The location of the off-chain storage 162 at the time the NFT 116 was minted can be specifically referred to in the NFT record 150. For example, the NFT record 150 can include a URL link to the NFT associated content 160.

In certain embodiments, the NFT 116 may include seed information that populates variables for a fixed NFT generation algorithm (e.g., an image or audio generation algorithm). Each seed can be a hexadecimal string generated in a random or pseudorandom manner at the time the token is minted. However, the algorithm is fixed, such that using a specific seed provides identical result each time. In embodiments, the seed can be stored as part of the NFT record 150 on the distributed ledger 156. The algorithm can be stored as part of the NFT record 150 and/or stored in off-chain storage 162. In this manner, the NFT associated content 160 can be generated on demand using the algorithm and the seed. This may permit greater on-chain storage capabilities, without requiring storage of large data files that are expensive to mint. The seed, and algorithm in embodiments, can be relatively small and inexpensive to record in the distributed ledger 156.

Off-chain storage 162 solutions are typically set by the minter of the NFT 116, and can vary in quality and security. For example, the off-chain storage can be a website, and the NFT record 150 can refer to an HTTP address. However, website access can be shut down if the account holder abandons the site. Further, the owner of the website can alter or replace the original NFT associated content 160. Other storage solutions may be longer-term or more stable, such as storage in InterPlanetary File System (IPFS) or Arweave. In IPFS storage, any added file is given its own unique identifier that acts as a permanent record of the file. Therefore, NFT associated content 160 stored off-chain in an IPFS storage may have a unique token identifier as part of the NFT record 150 and may also have a storage record, such as a content identifier (CID), as part of the stored file in the off-chain storage 162. Accordingly, different NFTs 116 may have different data persistence or mutability based on the quality of the off-chain storage 162. In an embodiment, NFT associated content 160 may be fixed at the time of minting of the NFT 116. However, in other embodiments, the NFT associated content 160 may be dynamic and updates when new credential data is received. The parameters of the updating may be set in the self-executing contract of the NFT 116. The NFT management system 104 may act as an arbiter or oracle of the terms of the contract.

As provided herein, the NFT management system 104 can be used to manage credentials for one or more user. In this manner, the NFT management system 104 may act as the holder of a digital NFT resume that includes different NFTs 116 with different credential information. NFTs 116 can be generated and distributed to qualifying users, such as qualifying military professionals, teachers, etc. The NFTs 116 could be characterized based on different milestones. For example, one NFT 116 could be awarded for 10+ years of service, whereas other NFTs 116 could be awarded for a certain military rank or an act of valor. The NFTs 116 could additionally be marked with the recipient's name or identifying information to act as proof of the credential in question. The NFTs 116 could act to certify resumes or standing of the user. In essence, the NFTs could be a representation of who the user is (education, degree, etc.), like a "clout" score. Also, the NFTs 116 could have appeal in a secondary market, especially if the user is well known and/or if the NFT 116 is based on a rare qualification. The system 104 can facilitate NFT transactions and receive a transaction fee for generating the NFTs 116, maintaining the NFTs 116, or for any sales or trades.

Figure 3:
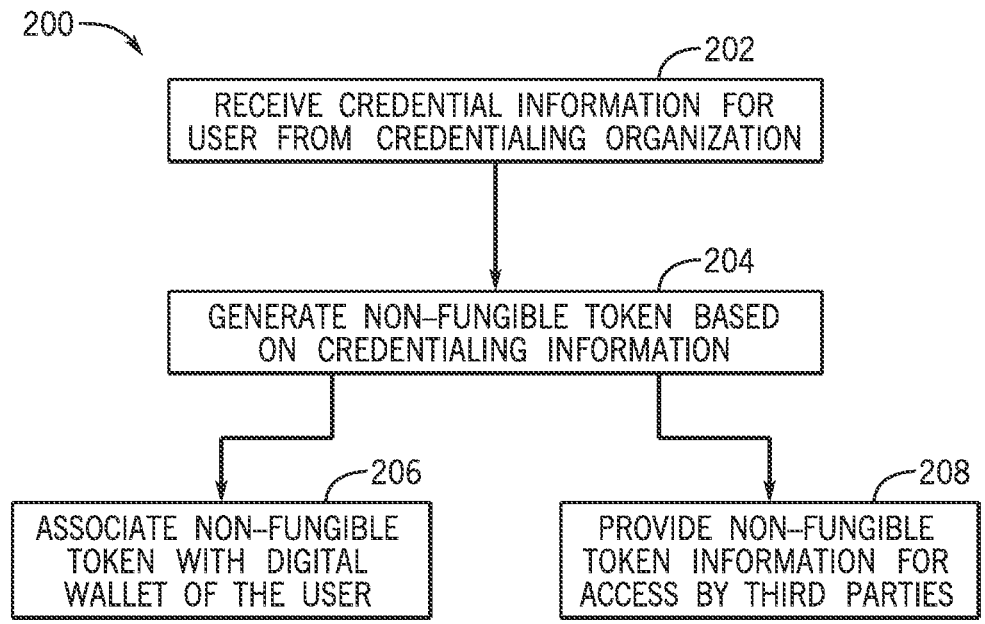
FIG. 3 is a flow diagram of an example method of non-fungible token management, in accordance with an embodiment.

FIG. 3 is a flow diagram of a method 200 of NFT management. Although the following description of the method 200 is described as being performed by the NFT management system 104, the method 200 may be performed by any suitable computing system and may include communication with other devices or entities as provided herein. In addition, although the method 200 is described in a particular order, it should be understood that the method 200 may be performed in any suitable order.

At step 202, the system 104 receives credential information, such as digital credential data, from a credentialing organization. In one example, the credentialing organization is a third party that interfaces with the system 104. In some cases, the credentialing organization can be a verified credentialing organization, such as an educational institution or a sports event organization. The system 104 can verify the credentialing organization as an authorized organization to confer a specific set of credentials.

At step 204, the system 104 generates an NFT 116 based on the credential information. As described above, the creation or minting of an NFT 116 includes confirmation of the NFT 116 as an asset on the blockchain. This makes it possible for the NFT 116 to then be traded or verifiably owned. The NFT 116 may include the NFT record 150 which uniquely identify the NFT associated content 160. Specifically, the location of the off-chain storage 162 may be determined at the time the NFT 116 is minted and specifically referred to in the NFT record 150. As such, the NFT management system 104 may provide the digital credential information of the NFT associated content 160 to the storage location referred to in the NFT record 150. After the NFT 116 is minted, the NFT management system 104 may store the NFT associated content 160 according to the NFT record 150. For example, the NFT management system 104 may store the associated digital credential information outside of the distributed ledger 162 in accordance to the NFT record 150. The NFT management system 104 may store the NFT 116 in the system, the cloud storage system 106, or the like. In other embodiments, the NFT management system 104 may place the NFT 116 into the marketplace for trading. In the system 104, the NFT 116 may be identified via an image (or other digital data) or the NFT record 150. The user 102 may select an advertising image, a string of text, or other digital data to represent their NFT 116.

In one example, the user can enter into an agreement with the credentialing organization to have the NFT 116 generated upon conferral of the credential. In an embodiment, the conferring of a degree can also trigger automatic sending of the credential information by the credential organization to the system 104. The system 104 can perform a verification to compare the credential information with the approved set of credentials associated with the credentialing organization. For example, if the credentialing organization is a primary school, the credentialing organization will not be approved as being able to confer post-secondary degrees. Similarly, if the credentialing organization is a national sports organization, the credentials that can be approved by the system will be limited to awards in a particular nation. Upon passing the verification, the NFT 116 is generated. The generated NFT 116 can be associated with a digital wallet of the user for whom the credential information is provided at step 206. Additionally or alternatively, information about the NFT 116 can be provided for access by third parties at step 208. In one example, an employer can verify the credentials associated with a user by viewing the digital wallet of the user. The viewing can be password protected, e.g., via an encrypted link.

In one example, the NFT 116 that is associated with the user can nonetheless be viewed as part of a portal or interface of the credentialing organization in the system 104. For example, a potential employer can receive a permission from the user with a particular degree from a university to view the NFT 116 showing degree conferral. The employer can then navigate to the university portal in the system 104 and provide the appropriate verification (e.g., password, encrypted link, private key) associated with the user's NFT 116. In this manner, the employer can navigate through an approved or familiar portal in the system 104 to access the NFT information as an additional level of verification. Each credentialing organization can have a dedicated portal in the system 104. Further, privacy for other users is maintained, because the employer can only view an NFT 116 for which permission is granted. In an embodiment, the NFT 116 can include degree information and/or transcripts.

Figure 4:
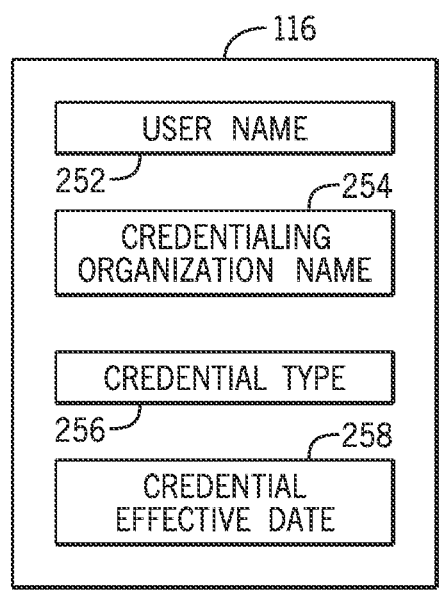
FIG. 4 is an example non-fungible token, in accordance with an embodiment.

An example NFT 116 that includes the credential information is shown in FIG. 4. The NFT 116 includes a field for the user name 252, the credentialing organization name 254, the credential type 256, and the credential effective date 258. In one example, the system 104 can prescribe the NFT format such that all similar credentials have a same format. In other embodiments, the NFT 116 may be an image capture or copy of the physical degree provided to a student.

Figure 5:
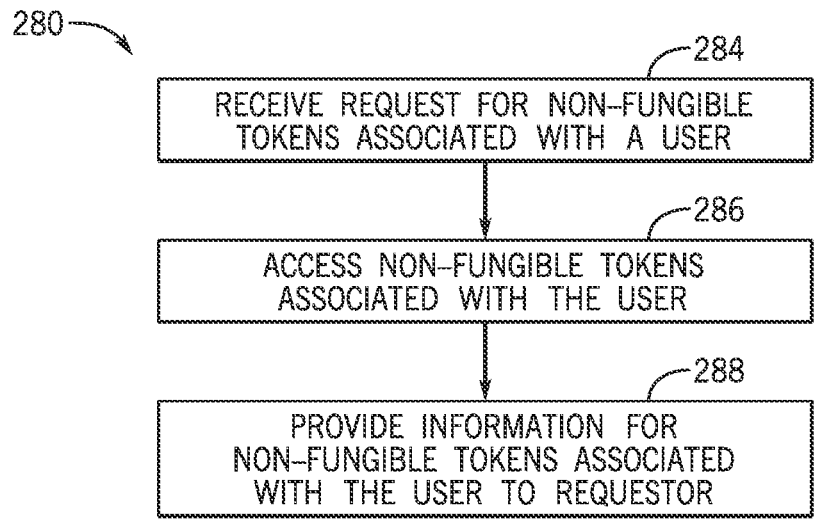
FIG. 5 is a flow diagram of an example method of non-fungible token management, in accordance with an embodiment.

FIG. 5 is a flow diagram of a method 280 of NFT management. Although the following description of the method 280 is described as being performed by the NFT management system 104, the method 280 may be performed by any suitable computing system and may include communication with other devices or entities as provided herein. In addition, although the method 280 is described in a particular order, it should be understood that the method 280 may be performed in any suitable order.

The method 280 may include a step of accessing, or attempting to access, NFT associated with a user at step 284. The NFTs 116 include associated content 160 of digital credential data of the user 102 located outside of the distributed ledger 156. The digital credential data of the user 102 may include data showing academic diplomas, academic degrees, certifications, security clearances, licenses, awards, proof of participation in events, years of service, and/or military rank.

The NFT associated content 160 may also include metadata. The NFT associated content 160 may be stored in an off-chain storage 162. The location of the off-chain storage 162 may be determined at the time the NFT 116 was minted and specifically referred to in the NFT record 150. As such, the storage location of the NFT associated content 160 may be determined based on the NFT record 150.

The NFT management system 104 may access the NFTs 116 associated with a user at step 286 provide the NFT associated content 160 to a requestor at 288. In another embodiment, the system 104 can provide searches based on particular credential types. For example, a searches using the system 104 can search for all NFTs 116 associated with a particular credential.

Figure 6:
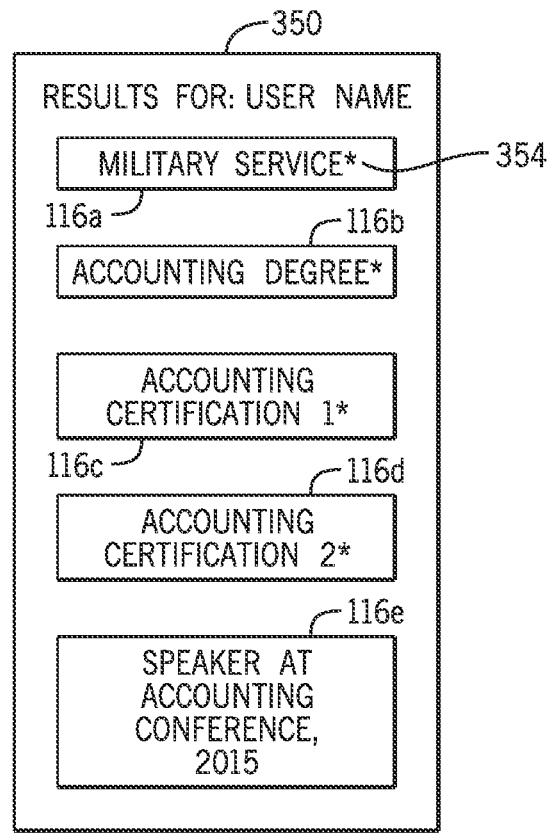
FIG. 6 is an example digital wallet including non-fungible tokens, in accordance with an embodiment.

In one embodiment, a full credential digital wallet of the user 102 can be accessed, showing all credentials. However, different levels of sharing can be set depending on the user privacy preferences. FIG. 6 shows an example interface for a digital wallet 350 showing different NFTs 116a-e for different credentials. In the illustrated example, the digital wallet 350 includes a military service credential icon, an accounting degree icon, accounting certification icons, and a conference icon. The icons are representative of respective NFTs 116a, 116b, 116c, 116d, 116e. The requestor or user 102 can interact with the icons to access the credential information of the NFTs 116. In an embodiment, different NFTs can include a verification marker 354, shown here as an asterisk. The verification marker can denote credentialing organizations that have been vetted as authenticated by the system 104. For example, the military service NFT 116*a* can be verified by the U.S. government, or the accounting degree can be verified by a university. Verification can provide assurances that the NFTs 116 are accurate representations of the credentials.

Figure 7:
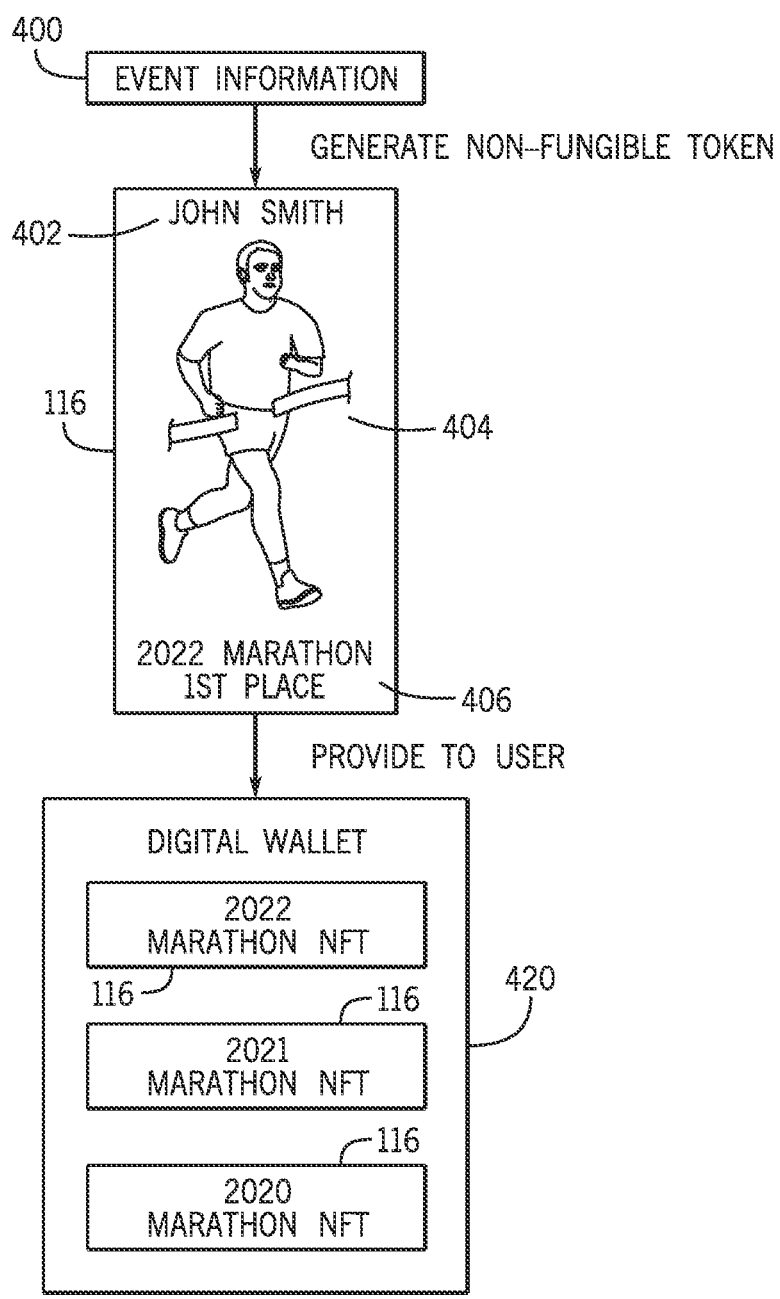
FIG. 7 is a schematic illustration of non-fungible token generation and management arrangement, in accordance with an embodiment.

The system 104 can operate as a clearinghouse for NFT generation or minting based on new data provided by a credentialing organization. As shown in FIG. 7, a credentialing organization, shown here as an organization sponsoring a race sporting event, provides event data 400 for participants, who may be users 102 of the system 104. Upon receiving the event data, the system 104 generates different NFTs 116 for participants. In one embodiment, the race registration fee can include an add-on for automatic NFT generation, and the event data 400 only includes event data for those who selected the add-on.

The generated NFT 116 can be generated based on the data provided for each participant. For example, if the data includes a photograph 404 associated with the participant, the NFT 116 includes the photograph. The data can include event name, year, participant place, participant time information (e.g., finishing time, splits). Once generated, the NFT 116 can be associated with a digital wallet 420 of the participant. The digital wallet 420 can include different NFTs 116 associated with different events. In this manner, a frequent participant of sporting events can have a verified record of their race information from different sporting events. Further, the digital wallet 420 can include NFTs 116 from different events having different sponsors (e.g., the Boston Marathon, the New York Marathon). Having the digital wallet 420 can provide a convenient way for participants to organize disparate event information in one place.

The system 104 can generate the NFTs 116 based on the available information. Because not all events are the same and provide information in the same manner, the system 104 can organize the NFT 116 based on the provided information. For example, if no race photo is available, then the NFT 116 can either leave a portion of the NFT image blank or move other information, such as finishing place, to the empty portion of the image. The participant can also select a format for the NFT 116, e.g., based on available templates.

While the illustrated example relates to sporting events, other types of specialized credentials are also contemplated. For example, a financial services organization can generate NFTs 116 based on spending habits, credit-worthiness, and/or professional reputation. Because these can touch on personal identifying information, the NFTs 116 can be encrypted or otherwise obscured from being viewed in the system 104 without the appropriate permissions.

Figure 8:
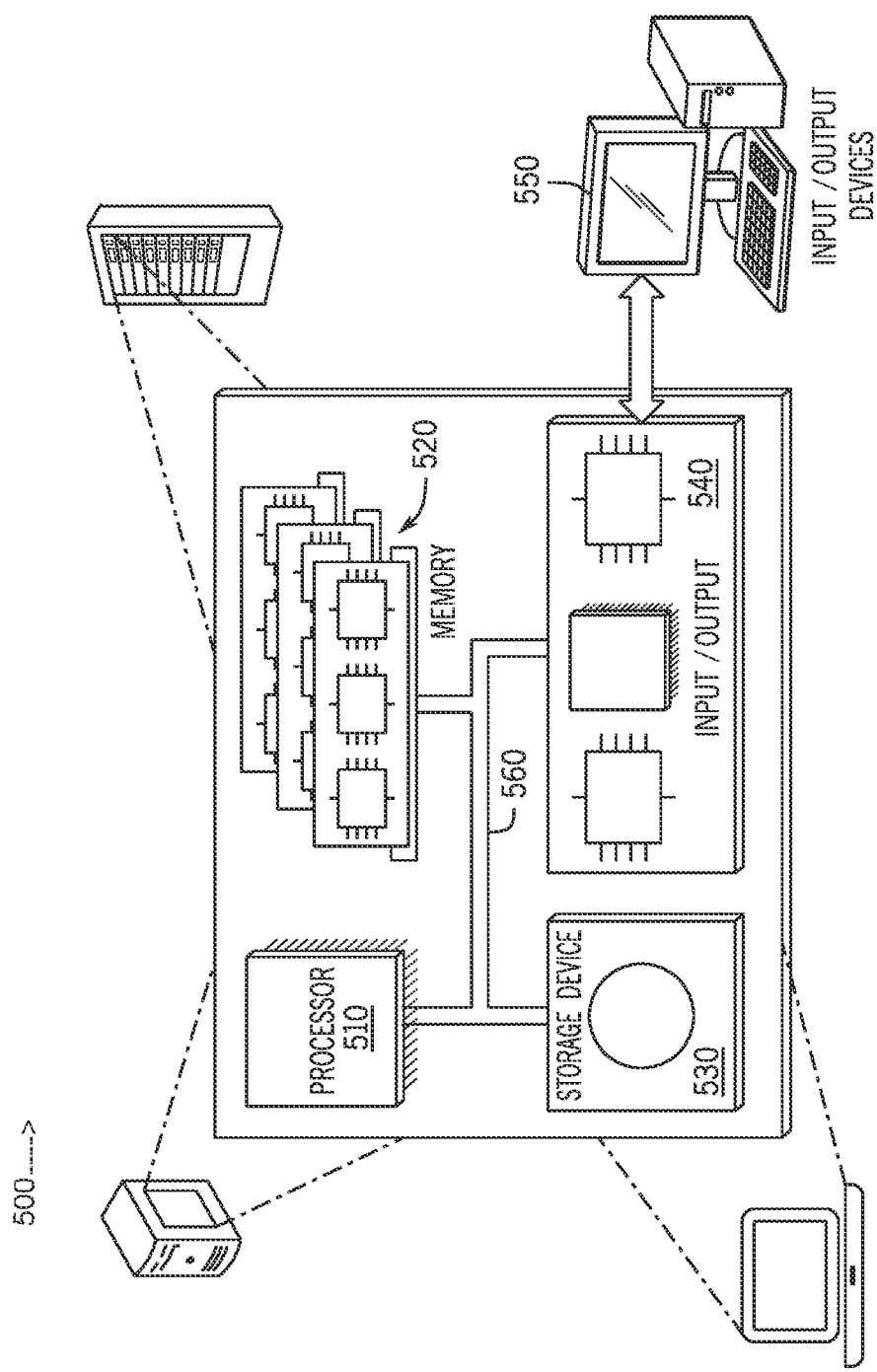
FIG. 8 is a schematic illustration of an example computing system that may be used in conjunction with the disclosed techniques, in accordance with an embodiment.

FIG. 8 illustrates an example computing system 500 that the embodiments described herein may use to perform their respective operations. The system 500 may be used for any of the operations described with respect to the various embodiments described herein, including the NFT management system 104 described herein. For example, the system 500 may be included, at least in part, in one or more of computing device(s) or system(s) described herein. In certain embodiments, the system 500 may include one or more processors 510, one or more memory 520, one or more storage devices 530, and one or more input/output (I/O) devices 550 controllable via one or more I/O interfaces 540. The various components 510, 520, 530, 540, or 550 may be interconnected via at least one system bus 1060, which may enable the transfer of data between the various modules and components of the system 500.

In certain embodiments, the processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. For example, the processor(s) 510 may execute instructions for the various software module(s) described herein. The processor(s) 510 may include hardware-based processor(s) each including one or more cores. The processor(s) 510 may include general purpose processor(s), special purpose processor(s), or both.

In certain embodiments, the memory 520 may store information within the system 500. In certain embodiments, the memory 520 includes one or more computer-readable media. The memory 520 may include any number of volatile memory units, any number of non-volatile memory units, or both volatile and non-volatile memory units. The memory 520 may include read-only memory, random access memory, or both. In certain embodiments, the memory 520 may be employed as active or physical memory by one or more executing software modules.

In certain embodiments, the storage device(s) 530 may be configured to provide (e.g., persistent) mass storage for the system 500. In certain embodiments, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In certain embodiments, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to, semiconductor memory devices, such as EPROM, EEPROM, and flash memory devices; magnetic disks such as internal hard disks and removable disks; magneto-optical disks; and CD-ROM and DVD-ROM disks. In certain embodiments, the processor(s) 510 and the memory 520 may be supplemented by, or incorporated into, one or more application-specific integrated circuits (ASICs).

In certain embodiments, the system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In certain embodiments, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500 or may be external on one or more computing devices of the system 500.

In certain embodiments, the system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-1032 standard for serial ports, or with a version of the IEEE AA884 standard for parallel ports. As another example, the I/O interface(s) 540 may be configured to provide a connection over Universal Serial Bus (USB) or Ethernet. In certain embodiments, the I/O interface(s) 540 may be configured to provide a serial connection that is compliant with a version of the IEEE AA994 standard.

In certain embodiments, the I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more communication networks using any network protocol.

Computing devices of the system 500 may communicate with one another, or with other computing devices, using one or more communication networks. Such communication networks may include public networks such as the Internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In certain embodiments, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to, a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), certain embodiments are not so limited. For example, in certain embodiments, a computing device may include one or more of a virtual computing environment, a hypervisor, an emulation, or a virtual machine executing on one or more physical computing devices. In addition, in certain embodiments, two or more computing devices may include a cluster, cloud, farm, or other grouping of multiple devices that coordinate operations to provide load balancing, failover support, parallel processing capabilities, shared storage resources, shared networking capabilities, or other aspects.

All of the functional operations described herein may be realized in digital electronic circuitry, or in computer software, firmware, or hardware, including the structures described herein and their structural equivalents, or in combinations of one or more of them. The embodiments described herein may be realized as one or more computer program products, i.e., one or more modules of computer program instructions encoded on a computer-readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Certain embodiments of the present disclosure include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with embodiments of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flow described herein may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any appropriate kind of digital computer. Generally, a processor may receive instructions and data from a read-only memory or a random access memory or both. Elements of a computer may include a processor for performing instructions and one or more memory devices for storing instructions and data. Generally, a computer may also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, certain embodiments of the system 500 may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

The embodiments described herein may be realized in a computing system 500 that includes a back-end component, e.g., as a data server, or that includes a middleware component, e.g., an application server, or that includes a front-end component, e.g., a client computer having a graphical user interface or a web browser through which a user may interact with an with the system 500, or any appropriate combination of one or more such back-end, middleware, or front end components. The components of the system 500 may be interconnected by any appropriate form or medium of digital data communication, e.g., a communication network. Examples of communication networks include a local area network ("LAN") and a wide area network ("WAN"), e.g., the Internet.

In certain embodiments, the computing system 500 may include clients and servers. A client and server are generally remote from each other and typically interact through a communication network. The relationship of client and server arises by computer programs running on the respective computers and having a client-server relationship to each other.

In certain embodiments, an application provides an interface for user interaction, such as a web interface or other graphical user interface (GUI). The application may interact with the smart contract(s). The interface may also be an application programming interface (API) that enables other processes to securely interact with the smart contract(s). The interface may enable a user to specify permission information, including individuals authorized to their information and/or constraints on such access. The interface may also enable the user to view information such as transaction history that is stored on the distributed ledger. In certain embodiments, a history may provide an auditable history of transactions, which are mediated by the smart contract(s) on the distributed ledger. Additionally, it should be noted that the smart contract(s) executing on a distributed ledger may make access authorization decisions based on permission information stored on the distributed ledger. In certain embodiments, the distributed ledger may be a blockchain, such as blockchain 120.

Embodiments of the present disclosure are also directed to secure device management. More particularly, embodiments of the present disclosure are directed to managing a network of devices using information and/or computer programming code on a distributed ledger system such as a blockchain. The computer programming code may include smart contracts, which may also be described as self-executing contracts, blockchain contracts, digital contracts, and/or chain code. As used herein, a smart contract refers to computer programming code executed by a distributed ledger system. For instance, smart contracts may refer to distributed programs, or distributed applications that can be used to perform the transactions and recordation in the blockchain infrastructure. Smart contracts may include data structures that may keep track of the state of the smart contract, as well as smart contract functions to interact with the smart contract. As the interactions with the smart contracts may only take place through the smart contract functions, the integrity of the state of the smart contract may be preserved. For example, smart contracts may be utilized in the exchange of information regarding users. As another example, smart contracts may be utilized in conjunction with financial transactions, such as payments or loans.

While this disclosure contains many specifics, these should not be construed as limitations on the scope of the disclosure or of what may be claimed, but rather as descriptions of features specific to particular embodiments. Certain features that are described in this disclosure in the context of separate embodiments may also be implemented in combination in a single embodiment. Conversely, various features that are described in the context of a single embodiment may also be implemented in multiple embodiments separately or in any suitable sub-combination. Moreover, although features may be described herein as acting in certain combinations and even initially claimed as such, one or more features from a claimed combination may in certain embodiments be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain embodiments, multitasking and parallel processing may be advantageous. Moreover, the separation of various system components in the embodiments described herein should not be understood as requiring such separation in all embodiments, and it should be understood that the described program components and systems may generally be integrated together in a single software product or packaged into multiple software products.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112(f).

The invention claimed is:

1. A non-fungible token management system, comprising:
memory storing executable instructions;
a processor configured to execute the instructions to:
receive digital credential data associated with a user from a credentialing organization, wherein the digital credential data associated with the user comprises character or native binary format data received from a database of the credentialing organization;
import the digital credential data associated with the user to a target database stored in the memory, wherein the target database comprises a target plurality of data fields;
identity a first set of fields in the target plurality of data fields that are present in the imported digital credential data and a second set of fields in the target plurality of data fields that are not present in the imported digital credential data; and
generate a non-fungible token responsive to receiving the digital credential data associated with the user, wherein the non-fungible token comprises a record in a distributed ledger and associated content based on the credential data associated with the first set of fields and the second set of fields in the target plurality of data fields, wherein the associated content is stored outside of the distributed ledger and wherein a storage location of the associated content of the non-fungible token is determined based on the record.

2. The system of claim 1, wherein the processor is further configured to execute instructions to:
incorporate at least a portion of the digital credential data associated with the user into the record in the distributed ledger.

3. The system of claim 1, wherein the processor is further configured to execute instructions to:
verify an identity of the credentialing organization; and
tag the non-fungible token as verified based on the verified identity.

4. The system of claim 1, wherein a first field of the plurality of data fields comprises a user name, a second field of the plurality of fields comprises a credential name of a credential of the user, and a third field of the plurality of fields comprises a credential issue date or a credential expiration date.

5. The system of claim 1, wherein the processor is further configured to execute instructions to dynamically generate a template for the associated content based on identities of the first set of fields.

6. The system of claim 1, wherein the processor is further configured to execute instructions to:
receive a request for non-fungible tokens of users having a specific credential;
search non-fungible tokens managed by the system for associated content comprising the specific credential; and
generate a report comprising a set of non-fungible tokens of the non-fungible tokens managed by the system having the associated content comprising the credential.

7. The system of claim 1, wherein the credential data associated with the user comprises a military rank achievement.

8. A non-fungible token management system, comprising:
memory storing executable instructions; and
a processor configured to execute the instructions to:
manage digital wallets for a population of users;
receive credential data associated with an individual user of the population of users from a credentialing organization;
import the credential data associated with the individual user of the population of the users to a target database stored in the memory, wherein the target database comprises a target plurality of data fields;
identity a first set of fields in the target plurality of data fields that are present in the imported credential data and a second set of fields in the target plurality of data fields that are not present in the imported credential data;
verify an identity of the credentialing organization;
generate a non-fungible token based on the credential data;
tag the non-fungible token as verified based on the verified identity; and
store the non-fungible token in a digital wallet of the user.

9. The system of claim 8, wherein the processor is further configured to execute instructions to:
determine that the credential data is received from the verified credentialing organization with the verified identity before generating the non-fungible token.

10. The system of claim 8, wherein the processor is further configured to execute instructions to identify and flag duplicate credentials in the population of users.

11. The system of claim 8, wherein the digital wallet of the user stores multiple non-fungible tokens, each comprising different credential data.

12. A non-fungible token management method, comprising:
receiving first digital credential data for a first user, wherein the first digital credential data associated with the first user comprises character or native binary format data received from a database of a credentialing organization;
verifying that the first digital credential data is from a verified credentialing organization;
populating a set of data fields of a plurality of data fields using the first digital credential data, comprising:

importing the first digital credential data associated with the first user to a target database, wherein the target database comprises a target plurality of data fields; and identifying a first set of fields in the target plurality of data fields that are present in the imported first digital credential data and a second set of fields in the target plurality of data fields that are not present in the imported first digital credential data;

using the populated data fields to generate a first non-fungible token;

receiving second digital credential data for a second user;

verifying that the second digital credential data is from the verified credentialing organization;

populating the set of data fields of the plurality of data fields using the second digital credential data, comprising:

importing the second digital credential data associated with the second user to the target database, wherein the target database comprises the target plurality of data fields; and identifying the first set of fields in the target plurality of data fields that are present in the imported second digital credential data and the second set of fields in the target plurality of data fields that are not present in the imported second digital credential data; and using the populated data fields to generate a second non-fungible token.

13. The method of claim 12, comprising:
receiving a request to view non-fungible tokens comprising a data field in the set of data fields; and
providing the first non-fungible token and the second non-fungible token based on the request.

14. The method of claim 12, wherein values of the populated data fields in first non-fungible token and the second non-fungible token are at least partially overlapping.

15. The method of claim 14, wherein the set of data fields comprises a results field for a sporting event, a name of the sporting event, and a year of the sporting event, and wherein values for the results field are different for the first non-fungible token and the second non-fungible token but values for the name of the sporting event and the year of the sporting event are the same for the first non-fungible token and the second non-fungible token.

16. The method of claim 15, wherein the verified credentialing organization is an owner of the sporting event.

17. The system of claim 1, wherein the processor is further configured to execute instructions to identify and flag duplicate credentials associated with the user.

18. The system of claim 1, wherein a digital wallet of the user stores the non-fungible token and one or more additional non-fungible tokens, each comprising different digital credential data.

19. The system of claim 8, wherein the credentialing organization is an authorized organization to confer a specific set of credentials.

* * * * *